United States Patent
Koeske et al.

(10) Patent No.: US 7,896,320 B2
(45) Date of Patent: Mar. 1, 2011

(54) JOUNCE BUMPER ASSEMBLY AND GAS SPRING ASSEMBLY INCLUDING SAME

(75) Inventors: Paul P. Koeske, Fishers, IN (US); Stephen C. Street, Carmel, IN (US); Pradipta N. Moulik, Carmel, IN (US); Joshua R. Leonard, Noblesville, IN (US); Robert A. Mundt, Noblesville, IN (US); James D. Boomer, Noblesville, IN (US)

(73) Assignee: BFS Diversified Products, LLC

( * ) Notice: Subject to any disclaimer, the term of this patent is extended or adjusted under 35 U.S.C. 154(b) by 796 days.

(21) Appl. No.: 11/820,432

(22) Filed: Jun. 19, 2007

(65) Prior Publication Data
US 2008/0315474 A1 Dec. 25, 2008

(51) Int. Cl.
F16F 9/04 (2006.01)
(52) U.S. Cl. ...................... 267/64.27; 267/122
(58) Field of Classification Search .......... 267/64.19, 267/64.21, 64.23, 64.27, 122
See application file for complete search history.

(56) References Cited

U.S. PATENT DOCUMENTS

| | | | |
|---|---|---|---|
| 3,475,015 A | 10/1969 | Hirst | |
| 3,565,456 A * | 2/1971 | Zoltok | 280/788 |
| 4,325,541 A | 4/1982 | Korosladanyi et al. | |
| 4,342,264 A | 8/1982 | Hindin et al. | |
| 4,398,704 A | 8/1983 | Buchanan, Jr. et al. | |
| 4,478,396 A | 10/1984 | Kawaura | |
| 4,506,910 A | 3/1985 | Bierens | |
| 4,787,606 A | 11/1988 | Geno et al. | |
| 5,087,020 A * | 2/1992 | Weber et al. | 267/64.19 |
| 5,201,500 A | 4/1993 | Ecktman et al. | |
| 5,382,006 A | 1/1995 | Arnold | |
| 5,535,994 A | 7/1996 | Safreed, Jr. | |
| 5,669,597 A * | 9/1997 | Rittstieg et al. | 267/64.21 |
| 5,934,652 A | 8/1999 | Hofacre et al. | |
| 6,070,861 A | 6/2000 | Ecktman | |
| 6,109,598 A | 8/2000 | Hilburger et al. | |
| 6,113,081 A | 9/2000 | Hilburger et al. | |
| 6,234,460 B1 | 5/2001 | Arnold | |
| 7,347,414 B2 * | 3/2008 | Groves | 267/220 |
| 2006/0226586 A1 * | 10/2006 | Levy | 267/64.27 |

FOREIGN PATENT DOCUMENTS

| | | | |
|---|---|---|---|
| EP | 80561 A1 * | 6/1983 | |
| GB | 1425229 A * | 2/1976 | |
| GB | 2117866 A * | 10/1983 | |
| JP | 60179538 A * | 9/1985 | |
| JP | 04004332 A * | 1/1992 | |
| JP | 07-238969 A | 9/1995 | |
| JP | 2003-343628 A | 12/2003 | |
| KR | 10-1999-0012553 A | 2/1999 | |
| KR | 10-2002-0049604 A | 6/2002 | |
| KR | 10-2005-0092516 A | 9/2005 | |

* cited by examiner

Primary Examiner — Thomas J Williams
(74) Attorney, Agent, or Firm — Thomas R. Kingsbury; Sarah M. Jabbari; Faysharpe, LLP

(57) ABSTRACT

A jounce bumper assembly includes a jounce bumper and a bumper retainer. The jounce bumper includes opposing end walls and a side wall extending therebetween. The bumper retainer includes a side wall for engaging the side wall of the jounce bumper and thereby restricting radially outward deflection of the jounce bumper. A gas spring assembly and a vehicle suspension system including a jounce bumper assembly are included. A method of utilizing a jounce bumper assembly is also included.

13 Claims, 5 Drawing Sheets

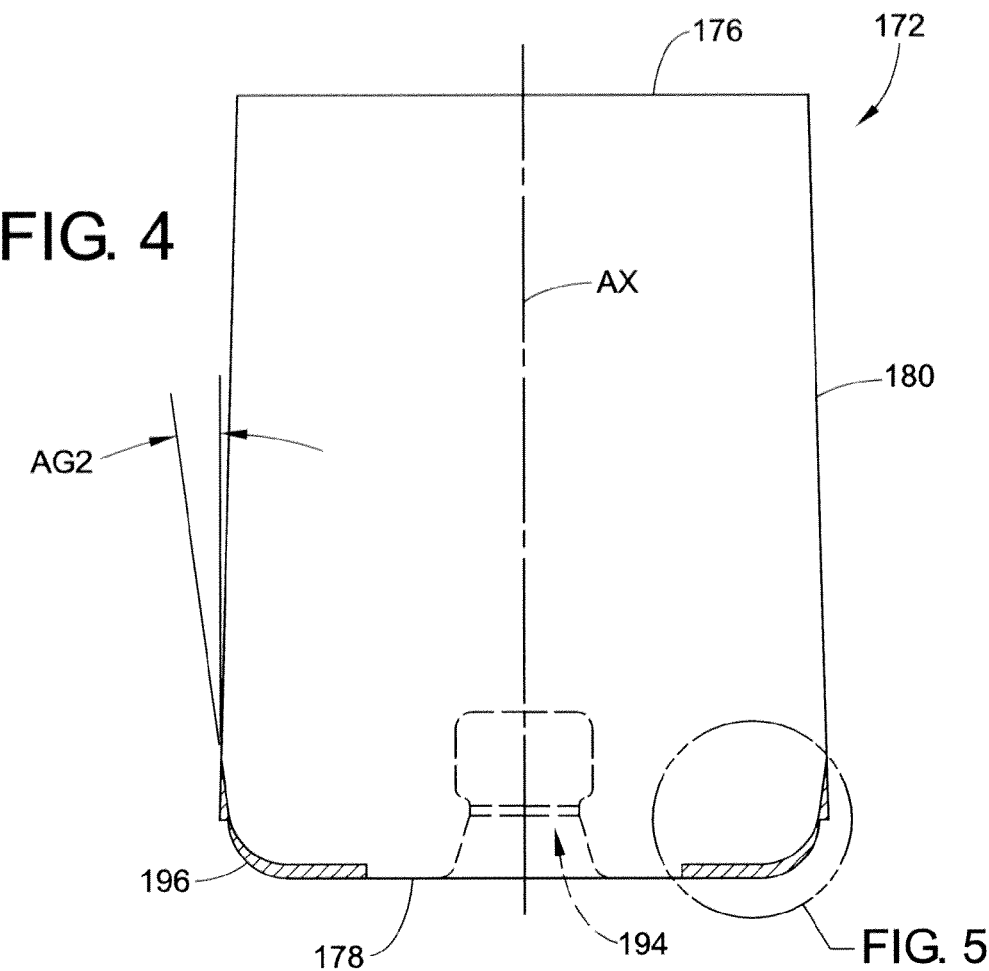
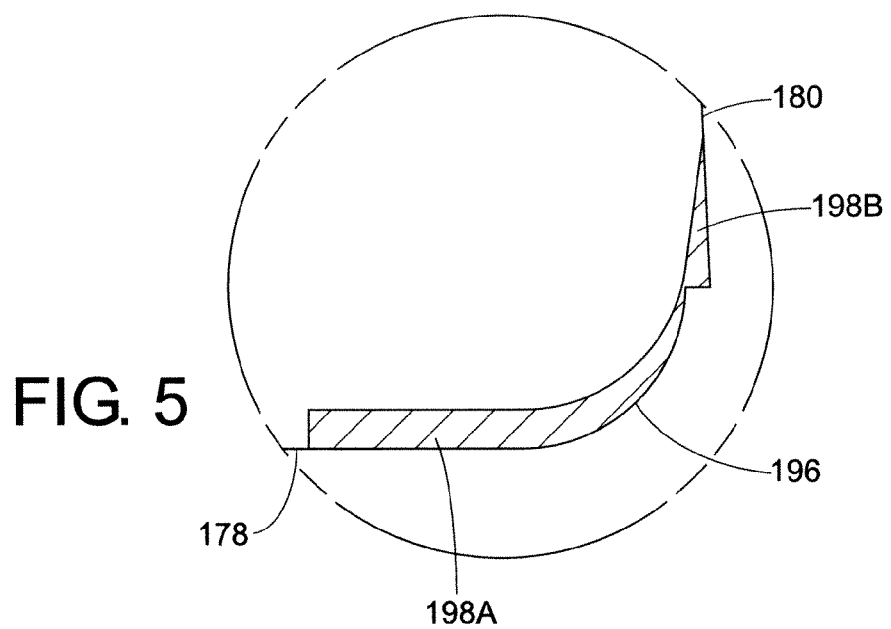

JOUNCE BUMPER ASSEMBLY AND GAS SPRING ASSEMBLY INCLUDING SAME

BACKGROUND

The subject matter of the present disclosure broadly relates to the art of vehicle suspension systems and, more particularly, to a jounce bumper assembly that is capable of dynamically tuned performance and a gas spring assembly including the same.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a fully compressed condition and a fully extended condition. To eliminate contact between opposing portions of the sprung and unsprung masses, contact between opposing portions of components of the suspension system or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Jounce bumpers of a variety of types, kinds and configurations have been developed and are commonly used. Though the size and shape of jounce bumpers vary widely, known jounce bumpers can generally be grouped into two categories, namely, compliant jounce bumpers and rigid jounce bumpers. The former are commonly formed from materials capable of relatively high deflections under load, and are often formed from rubber or elastomeric foam compounds. Generally, compliant jounce bumpers act to cushion or soften the impact that would otherwise be associated with a sudden movement toward a full jounce condition. As such, compliant jounce bumpers are well suited for use in relatively light duty applications, such as use in the suspension systems of passenger vehicles and light trucks, for example, where ride comfort is a more significant factor. Also, the high axial deflections that would be associated with heavily loading a compliant jounce bumper would generate high corresponding lateral strains in the jounce bumper. Generally, materials that are well suited for comfortably cushioning impacts under full jounce conditions have been found to be poorly suited to such corresponding high levels of lateral strain, which can undesirably modify the performance characteristics of the compliant jounce bumper or even result in permanent deformation of the same.

Oppositely, rigid jounce bumpers are commonly formed from materials that deflect a relatively small amount under load, such as high strength and/or fiber reinforced plastic materials, for example. Rigid jounce bumpers are not normally considered to be well suited for use in light duty applications (e.g., passenger vehicle applications) because of the minimal deflection and high impact associated with the use of such jounce bumpers. However, rigid jounce bumpers are well suited for heavy duty applications, such as in truck, tractor-trailer and other over-the-road vehicle applications, for example, where it is desirable to provide a sacrificial component that can prevent impacts between more permanent and/or expensive components. Additionally, it is often desirable to lower trucks, trailers or other vehicle bodies onto the jounce bumpers to provide a solid foundation for loading and/or unloading of the vehicle body. While high speed impacts acting on the jounce bumper are not an issue in such applications, substantial loads are still commonly involved. As discussed above, compliant jounce bumpers are normally formed from materials that are incapable of withstanding the loads associated with such heavy duty applications. As such, rigid jounce bumpers are commonly used.

Notwithstanding the successful use of rigid jounce bumpers in heavy duty applications, it is believed desirable to develop a jounce bumper that overcomes the forgoing and other disadvantages, such as, for example, by providing a jounce bumper for use in heavy duty applications that is capable of withstanding repeated impacts under the relatively high load conditions associated therewith, but which will also provide increased cushioning and reduced impact at least when initially contacted during jounce movement.

BRIEF DESCRIPTION

One exemplary embodiment of a gas spring assembly in accordance with the present novel concept is provided for use in forming an associated suspension system that is operative between an associated sprung mass and an associated unsprung mass of an associated vehicle. The gas spring assembly includes a first end member that is capable of being operatively connected to one of the associated sprung and unsprung masses, a second end member that is capable of being operatively connected to the other of the associated sprung and unsprung masses, and a flexible wall that includes first and second open ends. The flexible wall is disposed between the first and second end members to at least partially define a gas chamber therebetween. The first open end being secured on the first end member and the second open end being disposed along the second end member. An end closure includes a closure bottom wall and a closure side wall that extends from the closure bottom wall. The end closure is positioned such that the closure bottom wall is disposed toward the second end member and the closure side wall is in abutting engagement with the second open end of the flexible wall. The end closure is secured along the second end member such that a substantially fluid-tight connection is formed along the second open end of the flexible wall. A bumper retainer includes a retainer bottom wall and a retainer side wall that extends from the retainer bottom wall. The bumper retainer is supported on the second end member within the end closure such that the retainer bottom wall is disposed adjacent the closure bottom wall and the retainer side wall is disposed radially inwardly from the closure side wall. A resilient bumper includes a bumper top wall, a bumper bottom wall and a bumper side wall that extends therebetween. The resilient bumper also has a central axis extending between the bumper top and bottom walls. The resilient bumper is supported on the second end member and is received within the bumper retainer such that the bumper bottom wall is disposed along the closure bottom wall and at least a portion of the bumper side wall is disposed radially inwardly of the retainer side wall forming a free volume therebetween. The free volume is capable of permitting the retainer side wall to engage the bumper side wall under axial deflection of the jounce bumper to thereby restrict radially outward deflection of the jounce bumper.

Another exemplary embodiment of a gas spring assembly in accordance with the present novel concept is provided that includes a first end member and a second end member that is spaced from the first end member. A flexible wall is disposed between the first and second end members and forms a substantially fluid-tight connection with each thereof to form a spring chamber therebetween. A jounce bumper is supported within the spring chamber on one of the first and second end members. The jounce bumper includes an axis, a first bumper end wall, a second bumper end wall that is spaced from the first bumper end wall, and a bumper side wall that extends between the first and second bumper end walls. A bumper retainer is supported within the spring chamber on one of the first and second end members. The bumper retainer includes an axis, a retainer bottom wall and a retainer side wall that extends from the retainer bottom wall toward an opposing open end. The jounce bumper and the bumper retainer are positioned within the spring chamber in approximately coaxial relation to one another. The bumper side wall and the retainer side wall extend at a non-zero angle relative to one another. Upon one of the first and second bumper end walls engaging the retainer bottom wall, a first radial gap is formed between the bumper side wall and the retainer side wall at a first axial position and a second radial gap between the bumper side wall and the retainer side wall is formed at a second axial position that is spaced from the first axial position. Upon axial displacement of the first and second bumper end walls toward one another due to relative movement of the first and second end members toward one another, the first and second end members compressively engage the jounce bumper therebetween. The bumper side wall and the retainer side wall abuttingly engage one another thereby at least partially resisting radially outward displacement of the jounce bumper, with the radially outward displacement being induced by the axial displacement of the jounce bumper.

One exemplary embodiment of a jounce bumper assembly in accordance with the present novel concept is provided that is capable of use within a spring chamber of a gas spring assembly. Such a gas spring assembly can include opposing end members that are secured to a flexible wall which at least partially forms the spring chamber therebetween. The jounce bumper assembly includes a resilient jounce bumper and a bumper retainer. The resilient jounce bumper includes an axis, a first bumper end wall, an opposing second bumper end wall and a bumper side wall extending between the first and second bumper end walls. The jounce bumper also has a bumper height. A bumper retainer includes an axis, a retainer bottom wall that extends approximately transverse to the axis and a retainer side wall that extends from the retainer bottom wall toward an opposing open end. The bumper retainer has a retainer height of from about 20 percent to about 80 percent of the bumper height. The jounce bumper is approximately coaxially received within the bumper retainer such that the first bumper end wall is disposed in abutting engagement with at least a portion of the retainer bottom wall and such that the second bumper end wall projects outwardly from the open end of the bumper retainer. The bumper side wall and the retainer side wall extend at a non-zero angle relative to one another such that a free volume is formed therebetween. The free volume has a first radial gap between the bumper side wall and the retainer side wall at a first axial position and a second radial gap between the bumper side wall and the retainer side wall at a second axial position spaced from the first axial position.

One exemplary method in accordance with the present novel concept of utilizing a jounce bumper assembly that is disposed between displaceably supported structural members is provided. The method includes providing a jounce bumper that includes an axis, a first bumper end wall, a second bumper end wall spaced from the first bumper end wall, and a side wall extending between the first and second bumper end walls. The method also includes supporting the jounce bumper between the structural members. The method further includes providing a bumper retainer that includes an axis, a retainer bottom wall and a retainer side wall extending from the retainer bottom wall toward an opposing open end. The method also includes supporting the bumper retainer between the structural members in approximately coaxial alignment with the jounce bumper. The method further includes compressing the jounce bumper in response to relative displacement of the structural members and thereby axially inwardly and radially outwardly deflecting the jounce bumper. The method also includes abuttingly engaging the bumper side wall and the retainer side wall and thereby at least partially restricting radially outward deflection of at least a portion of the jounce bumper, which radially outward deflection is at least partially due to the axially inward deflection.

BRIEF DESCRIPTION OF THE DRAWINGS

FIG. 4 is a side view of the exemplary embodiment of a jounce bumper in FIGS. 2 and 3.

FIG. 5 is a greatly enlarged view of the portion of the jounce bumper shown as Detail 5 in FIG. 4.

DETAILED DESCRIPTION

Figure 1:
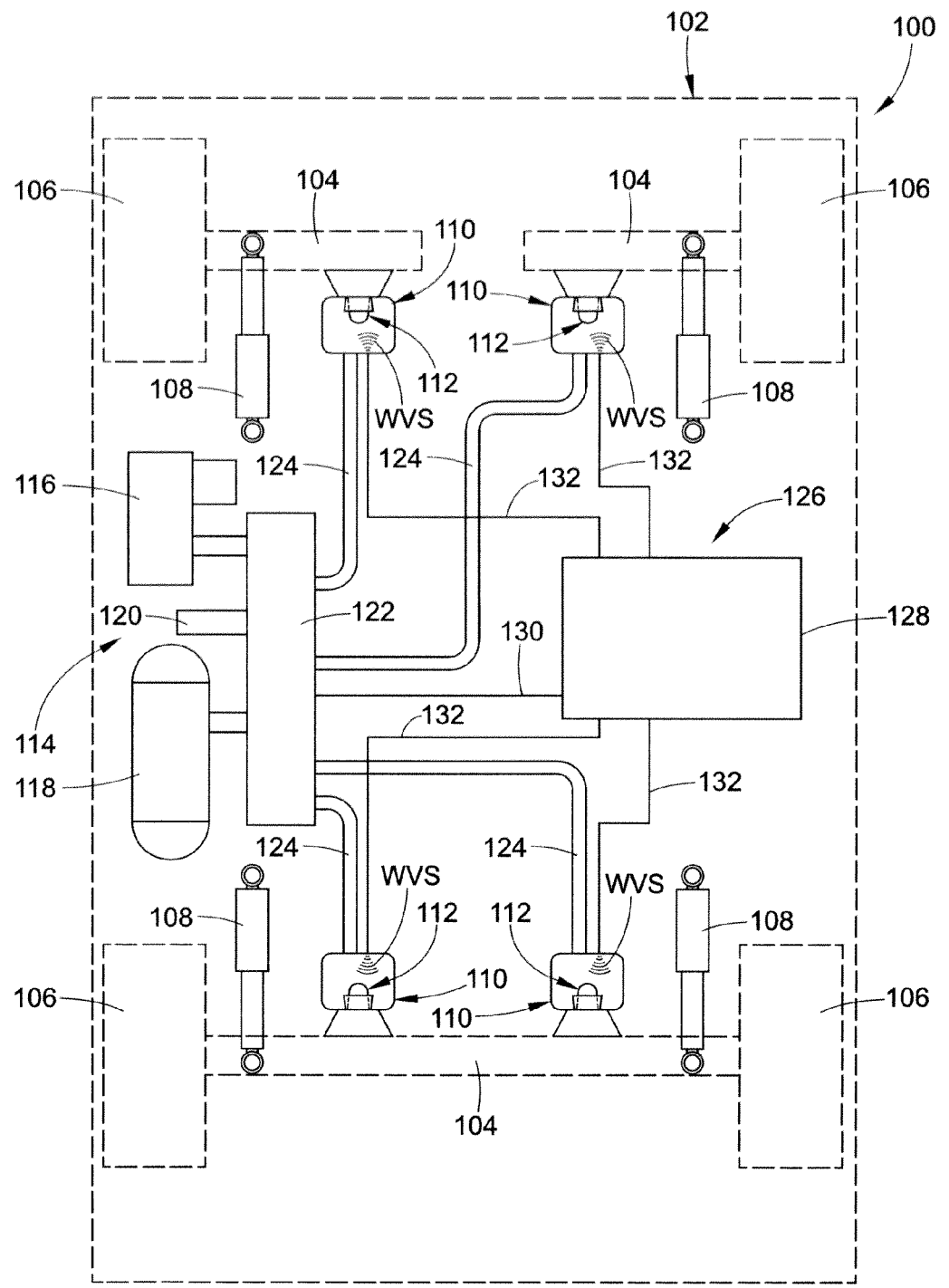
FIG. 1 is a schematic representation of one exemplary embodiment of a vehicle suspension system in accordance with the present disclosure.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and/or wheels 106, for example. A plurality of damping members, such as shock absorbers 108, for example, can be secured between the sprung and unsprung masses of the vehicle in a suitable manner. Additionally, a plurality of gas spring assemblies 110 are disposed in a suitable manner between the sprung and unsprung masses of the vehicle, such as adjacent wheels 106 and shock absorbers 108 as shown in FIG. 1, for example. Furthermore, one or more of the plurality of gas spring assemblies can include a jounce bumper assembly 112 operatively associated therewith.

Vehicle 100 also includes a pressurized gas supply system 114 that is in communication with gas spring assemblies 110 and that is operative to selectively supply pressurized gas thereto and exhaust pressurized gas therefrom. Gas supply system 114 includes a pressurized gas source, such as a compressor 116, and can optionally include a storage vessel, such as a reservoir 118, for example, for receiving and storing pressurized gas, such as may be generated by the pressurized gas source. System 114 can further include a suitable exhaust, such as a muffler 120, for example, for venting pressurized gas from the system.

Gas supply system 114 can be in communication with the gas spring assemblies in any suitable manner. For example, system 114 can include a valve assembly 122 or other suitable device or arrangement for selectively distributing pressurized gas to, from and/or between the pressurized gas source or sources, the exhaust and/or the gas spring assemblies. As shown in the exemplary embodiment in FIG. 1, compressor 116, reservoir 118 and muffler 120 are in fluid communication with valve assembly 122 and can be selectively placed in fluid communication with one another therethrough. Additionally, assemblies 110 are in fluid communication with valve assembly 122 via transmission lines 124 and, thus, can be selectively placed in communication with the compressor, reservoir, muffler and/or one another therethrough.

In operation of the exemplary embodiment shown in FIG. 1, valve assembly 122 can be selectively actuated to transfer pressurized gas from the compressor and/or reservoir to one or more of the gas spring assemblies. Additionally, valve assembly 122 can be selectively actuated to exhaust pressurized gas from one or more of the gas spring assemblies by way of muffler 120 or another suitable arrangement. It will be appreciated that the foregoing fluid supply system and operation thereof are merely exemplary and that any other suitable pressurized gas source, system and/or method of operation in accordance with the present novel concept could alternately be used.

Vehicle 100 also includes a suspension control system 126 for selectively operating, adjusting or otherwise influencing or controlling the performance or one or more suspension system components, such as gas spring assemblies 110 and/or pressurized gas supply system 114, for example. Suspension control system 126 includes an electronic control unit (ECU) 128 that is in communication with one or more components of valve assembly 122, such as through a communication line 130, for example, for selective actuation and/or operation thereof. ECU 128 is also shown in FIG. 1 as being in communication with optional height sensing devices (not shown) that can be used in association with gas spring assemblies 110. It will be appreciated that such communications, if provided, can be implemented in any suitable manner, such as by way of communication lines 132, for example. Additionally, it will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves WVS, for example.

It will be appreciated that gas spring assemblies 110 can take any suitable form, configuration and/or construction. In the embodiment in FIG. 1, each assembly 110 is shown as being of a rolling lobe-type construction that includes opposing end members (not numbered in FIG. 1). A flexible wall (not numbered in FIG. 1) is suitably secured between the opposing end members and at least partially defines a spring chamber (not numbered in FIG. 1), which can be in fluid communication with transmission line 124 in any suitable manner. In the exemplary embodiment shown, a jounce bumper assembly 112 is supported within the spring chamber on one of the end members of each gas spring assembly. It will be appreciated, however, that any other suitable arrangement, configuration and/or construction of gas spring assembly can alternately be used.

Figure 2:
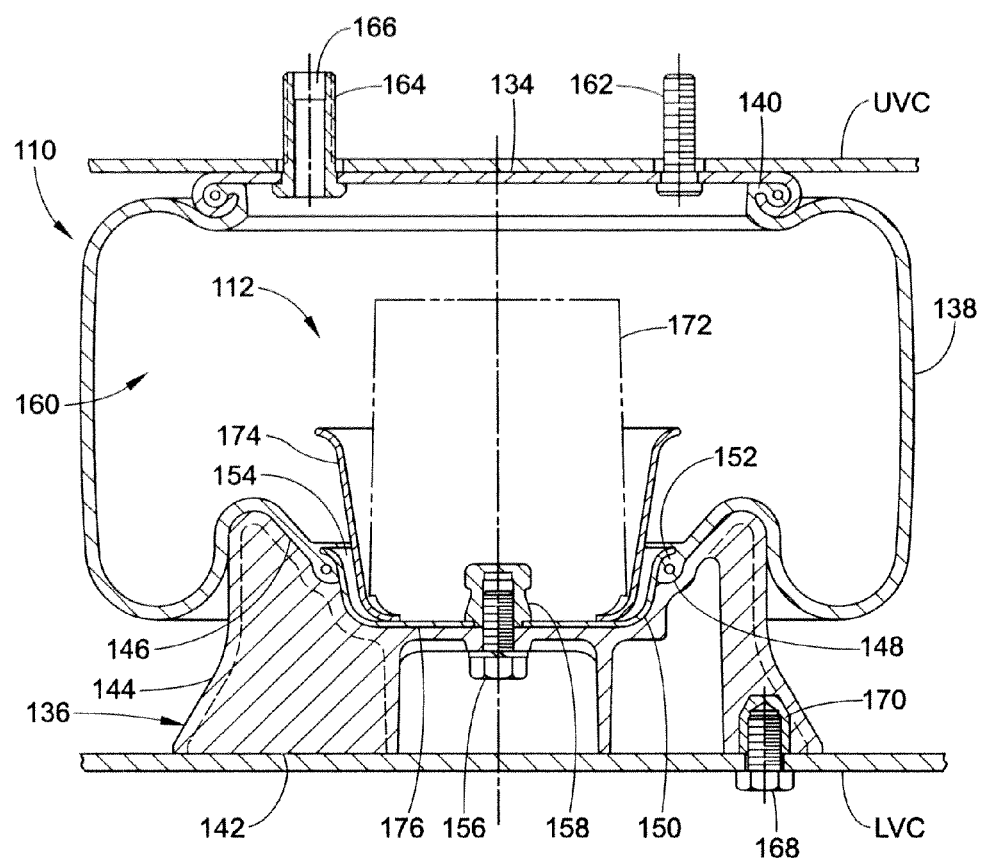
FIG. 2 is a cross-sectional side view of one exemplary embodiment of a gas spring assembly in accordance with the present disclosure.

As illustrated in greater detail in FIG. 2, gas spring assembly 110 includes a first end member, such as a bead plate 134, for example, and a second end member, such as a piston 136, for example, that is spaced from the first end member. A flexible wall 138 is disposed between the first and second end members and can be secured thereto in any suitable manner. In the exemplary embodiment shown in FIG. 2, a first open end 140 of flexible wall 138 is secured on bead plate 134 using a roll crimped connection. Piston 136 includes a base wall 142, a side wall 144 extending from the base wall, and a somewhat dish-shaped upper end wall 146 opposite the base wall. Upper end wall 146 includes a bead-receiving section 148 and a somewhat cup-shaped bottom wall section 150.

An opposing second open end 152 of flexible wall 138 is received along bead-receiving portion 148. An end closure 154 is received on piston 136 within bottom section 150 and engages second open end 152 of flexible wall 138. End closure 154 can be secured on piston 136 in any suitable manner. For example, a fastener 156 can extend through a passage (not numbered) in the piston and a corresponding opening (not numbered) in the end closure and engage a cooperative securement device, such as a threaded nut 158, for example. Upon suitably securing end closure 154 on piston 136, a substantially fluid-tight seal is formed between the end closure and the second open end of the flexible wall. As such, a substantially fluid-tight spring chamber 160 is defined by flexible wall 138 generally between the first and second end members.

The end members of gas spring assembly 110 can be secured on suitable structural components, such as upper and lower vehicle components UVC and LVC, for example, in any suitable manner. In the exemplary embodiment shown in FIG. 2, bead plate 134 includes a first mounting stud 162 and second mounting stud 164 that can be secured on upper vehicle component UVC in a suitable manner, such as by using threaded nuts (not shown), for example. The spring chamber of gas spring assembly 110 can be in communication with the pressurized gas supply system in any suitable manner. For example, second mounting stud 164 can include a passage 166 formed therethrough that is suitable for permitting fluid communication between a transmission line, such as transmission line 124 (FIG. 1) and spring chamber 160.

Piston 136 is shown in FIG. 2 as being supported on lower vehicle component LVC and can be secured thereto in any suitable manner, such as by using a fastener 168 to engage a corresponding securement feature on the piston, such as a threaded passage 170, for example. It will be appreciated, however, that the above-discussed arrangement is merely exemplary and that any other suitable arrangement can alternately, or additionally, be used.

A jounce bumper assembly 112 is shown in FIG. 2 as including a jounce bumper 172 and a jounce bumper retainer 174. In the exemplary embodiment shown in FIG. 2, jounce bumper assembly 112 is illustrated as being disposed along upper end wall 146 of piston 136. However, it will be appreciated that a jounce bumper assembly or any one or more components thereof can be disposed along either of the first or second end members or in any other suitable arrangement, position, configuration and/or manner. In FIG. 2, jounce bumper assembly 112 is shown as being received within end closure 154 and supported along a bottom wall 176 thereof. It will be appreciated that the jounce bumper assembly can be secured within the spring chamber in any suitable manner, such as, for example, by receiving jounce bumper 172 on nut 158 and thereby capturing retainer 174 between the jounce bumper and the end closure. Alternately, the bumper retainer and the jounce bumper can be separately secured on or along the same or different components. For example, the bumper retainer could be welded or otherwise secured on the end closure and the jounce bumper could be received on the nut as shown. As another example, the bumper retainer could be secured on or along one end member (e.g., bead plate 134) with the jounce bumper supported on or along the other end member (e.g., piston 136).

Figure 3:
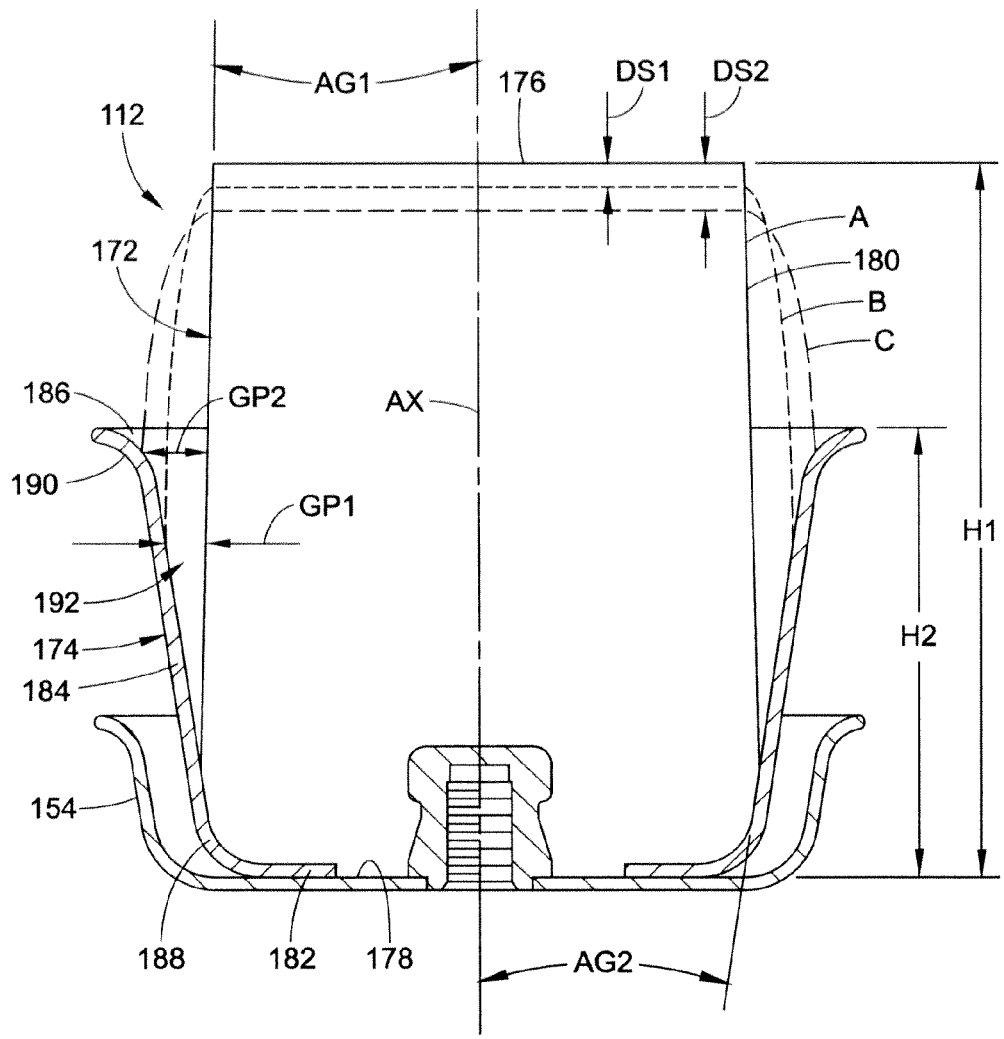
FIG. 3 is an enlarged side view, in partial cross-section, of the exemplary embodiment of a jounce bumper assembly in FIG. 2.

As shown in greater detail in FIGS. 3-5, jounce bumper 172 of jounce bumper assembly 112 includes a top or upper end wall 176, a bottom or lower end wall 178, and a central axis AX extending between the upper and lower end walls. As such, end walls 176 and 178 may be referred to as being axially or longitudinally spaced from one another. A side wall 180 extends between the upper and lower end walls and is disposed circumferentially around axis AX. As such, side wall 180 may be referred to as being laterally or radially outwardly spaced from axis AX. Though it will be appreciated that any other shape or configuration could alternately be used, end walls 176 and 178 are shown in the present exemplary embodiment as being substantially planar.

Side wall 180 extends at an angle, indicated by dimension AG1 in FIG. 3, relative to axis AX and, as such, generally establishes a generally frustoconical outer surface of the jounce bumper. While it will be appreciated that any suitable angle can be used, one exemplary range for angle AG1 is from about 1 degree to about 30 degrees. In the exemplary embodiment shown, side wall 180 is disposed at an angle AG1 of about 3 degrees from the axis. Additionally, jounce bumper 172 can be of any suitable height, such as is indicated by dimension H1, that would be suitable for the intended application, environment and/or conditions of use of the jounce bumper. One example of a suitable range of heights for the jounce bumper is from about 1 inch to about 12 inches. Furthermore, in the embodiment shown in FIGS. 2-4, jounce bumper 172 also includes a cavity 194 (FIG. 4) formed thereinto from along bottom wall 178, which cavity is cooperable with a suitable device or component capable of securing the jounce bumper and/or other components of the jounce bumper assembly on or along the gas spring assembly. Notwithstanding the foregoing exemplary description, it will be appreciated that a jounce bumper of any suitable shape, configuration and/or construction can alternately be used.

Jounce bumper assembly 112 also includes jounce bumper retainer 174 that includes a bottom wall portion 182 and a side wall portion 184 extending from bottom wall portion 182 toward an opposing open end 186. A radiused corner 188 can optionally be formed between bottom wall portion 182 and side wall portion 184. Additionally, the side wall extends from along bottom wall portion 182 toward open end 186 and terminates at an upper end 190 of side wall portion 184. Optionally, the upper end can be outwardly flared or include another suitable profile.

Retainer 174 has an overall height, as indicated by dimension H2, that is shown in FIG. 3 as extending from approximately bottom wall portion 182 to approximately upper end 190. In one preferred arrangement, retainer height H2 is established in relation to height H1 of jounce bumper 172, such as by determining the retainer height as a percentage of the jounce bumper height, for example. One example of a suitable range is for retainer height H2 to be from about 20 percent to about 80 percent of jounce bumper height H1. One preferred range is for retainer height H2 to be from about 40 percent to about 70 percent of jounce bumper height H1. In the exemplary embodiment shown in the drawings, the retainer height is about 60 percent of the jounce bumper height. While a height determination based at least in part on a relative percentage calculation is discussed above, it will be appreciated that any other suitable relationship, determination and/or calculation could alternately be used. Additionally, as shown in FIG. 3, side wall portion 184 of retainer 174 extends outwardly at an angle, generally indicated by dimension AG2, relative to axis AX and thereby forms a generally frustoconical inner surface. Though it will be appreciated that any suitable angle can be used, one example of a suitable range for angle AG2 is from about 5 degrees to about 50 degrees. In the exemplary embodiment shown in the drawings, side wall portion 184 extends at angle AG2 of about 15 degrees.

Due to the orientation of bumper side wall 180 and retainer side wall 184 relative to one another, a free volume 192 is formed therebetween. It will be appreciated that the side walls of the jounce bumper and the bumper retainer can have any suitable shape, profile and/or configuration, and that the generally frustoconical side walls shown and described herein are merely exemplary and not intended to be limiting. Thus, it will be further appreciated that any such corresponding free volume can be of any size, shape and/or configuration as may be suitable for providing a jounce bumper assembly having desired performance characteristics for a given application, operation and/or use.

As shown in the exemplary embodiment in FIGS. 2 and 3, bumper side wall 180 forms a generally frustoconical outer surface of the jounce bumper. Additionally, retainer side wall 184 forms a generally frustoconical inner surface of the bumper retainer. Due to the shape and relative alignment of the inner and outer surfaces in the exemplary embodiment shown, the free volume formed therebetween has a somewhat pie or wedge-shaped annular cross section. As such, at a first position along axis AX, a distance or gap between bumper side wall 180 and retainer side wall 184 is generally indicated by dimension GP1. At a second position along axis AX, which second position is space from the first position in a direction opposite bottom end wall 178, a distance or gap between the bumper side wall and the retainer side wall is generally indicated by dimension GP2. In the exemplary embodiment shown, gap GP2 is greater than gap GP1 due to the somewhat pie-shaped annular cross section of the free volume. It will be appreciated, however, that any other suitable inner and outer surface profiles and/or angular alignments, resulting in any other corresponding annular cross sectional shapes and/or configurations, could alternately be used without departing from the scope and intent of the subject novel concept.

Turning, briefly, to FIGS. 4 and 5, jounce bumper 172 is shown in additional detail and can optionally include cavity 194 complimentary to nut 158 (FIGS. 2 and 3) and suitable for receivably securing the jounce bumper thereon. Alternately, any other suitable mounting features and/or arrangements could be used. Additionally, jounce bumper 172 can include one or more features cooperable with the bumper retainer or other components. For example, jounce bumper 172 is shown as including a rounded corner 196 that can be complimentary to optional rounded corner 188 (FIG. 3) of the bumper retainer. The jounce bumper can be freely supported within the bumper retainer under a no-load condition of the jounce bumper. Alternately, a minimal portion, shown as areas 198A in FIGS. 4 and 5, of the jounce bumper could optionally be initially compressed after assembly with the bumper retainer. Additionally, or as a further alternative, while under a no-load condition of the jounce bumper, a portion 198B of side wall 180 of the jounce bumper can also be optionally conformed to side wall portion 184 (FIG. 3) indicated by dimension AG2 in FIG. 4.

In use, a jounce bumper assembly in accordance with the present novel concept can provide one or more desired performance characteristics. For example, a subject jounce bumper assembly can provide resistance to impact fatigue (i.e., provide the capability to withstand repeated impact loads) under the relatively high load conditions associated with heavy duty applications. A jounce bumper assembly according to the present novel concept can also provide the capability to tune the performance characteristics (e.g., spring rate and deflection) of the jounce bumper assembly by using differently shaped bumper and retainer side wall combinations to form different free volume configurations therebetween. The subject jounce bumper assembly can also achieve deflection, load carrying and other performance capabilities between those capabilities commonly provided by jounce bumpers formed from compliant materials (e.g., rubber and elastomeric foams) and those capabilities commonly associated with jounce bumpers formed from more rigid materials (e.g., fiber-reinforced and other high-strength plastics). Additionally, jounce bumper assemblies in accordance with the present novel concept can provide enhanced ride quality by permitting compliance during initial jounce travel of the suspension system while stiffening sufficiently during further jounce travel to minimize bump-through of road or other inputs. Furthermore, a jounce bumper assembly in accordance with the present novel concept can be capable of withstanding the loads associated with, and thereby functioning as a dock stabilizer for, the loading and unloading of the vehicle.

To illustrate the use of a jounce bumper assembly in accordance with the present novel concept, jounce bumper 172 of jounce bumper assembly 112 is shown in FIG. 3 as being in a first, unloaded and undeflected condition, as indicated by reference character A. The jounce bumper can be axially deflected or displaced due to contact with any known components in any known configurations and/or arrangements, such as, for example, by having an opposing end member of a gas spring assembly, within which the jounce bumper assembly is disposed, contact the free end of the jounce bumper. The jounce bumper then being compressed in response to relative movement of associated structural members on or between which the end members of the gas spring assembly are disposed. As the free end (e.g., upper end wall 176) of the jounce bumper is displaced through a first axial distance, such as the exemplary distance represented by dimension DS1, for example, a corresponding lateral or radially outward displacement of the jounce bumper results, which radially outward displacement has a relation, at least in part, to the stress-strain properties of the material forming the jounce bumper.

In the exemplary representation in FIG. 3, a second condition of the jounce bumper is shown in FIG. 3, as indicated by reference character B, which second condition is associated with the jounce bumper being displaced through first axial distance DS1 and resulting in the corresponding radially outward displacement. It will be recognized from the deformation of the jounce bumper represented by reference character B that the radially outward displacement of the jounce bumper, which is shown as being approximately equal to first gap GP1, at least partially fills or otherwise reduces the size of free volume 192.

Upon further displacement of the free end of the jounce bumper through a second axial distance, such as the exemplary distance represented by dimension DS2, for example, toward a third condition, which is indicated by reference character C, a further radially outward displacement of the jounce bumper occurs. This further radially outward displacement, which is shown in FIG. 3 as being approximately equal to second gap GP2, further fills or otherwise reduces the size of free volume 192. It will also be appreciated that in the exemplary embodiment shown the degree of influence that retainer side wall 184 will have on the jounce bumper will begin to diminish as the jounce bumper is further deflected in the axial direction. This is due, at least in part, to the reduced radially support provided by outwardly flared end wall 190 of bumper retainer 174.

Figure 6:
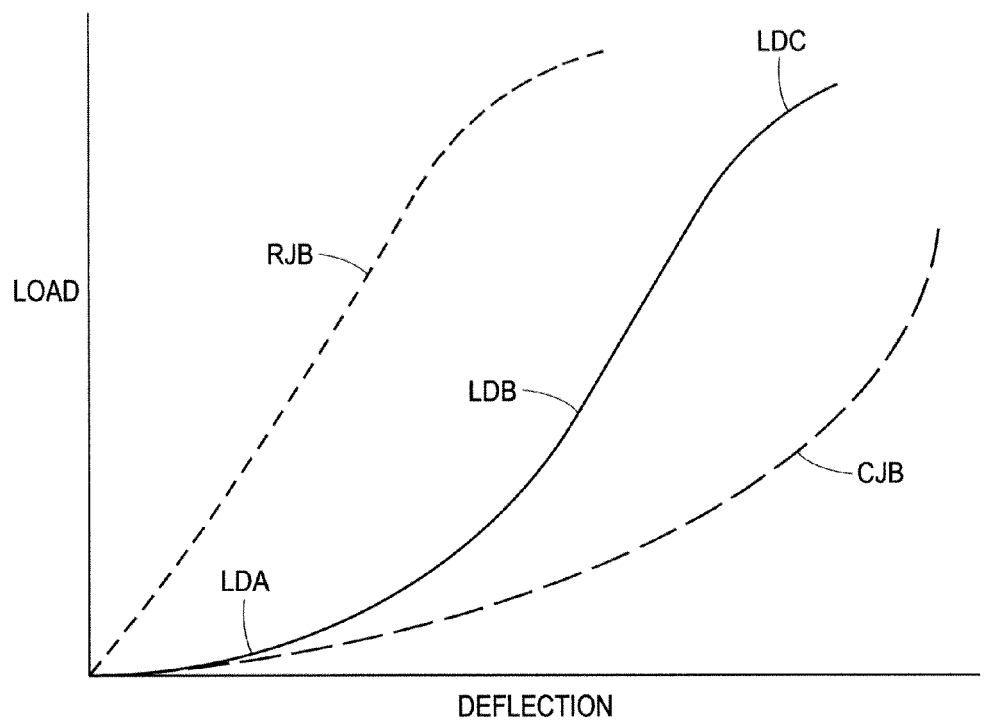
FIG. 6 is a graphical representation of load versus deflection relationships for a jounce bumper assembly in accordance with the present disclosure relative to known jounce bumper constructions.

As the jounce bumper is initially displaced from the free or unloaded condition represented by reference character A toward the condition represented by reference character B, it is expected that the load versus deflection relationship of the jounce bumper of a jounce bumper assembly in accordance with the present novel concept, such as jounce bumper 172, for example, would initially approximately correspond to the load versus deflection relationship of known compliant bumpers, as indicated by reference character LDA of the load versus deflection curve in FIG. 6. However, as the side wall of the jounce bumper increasingly engages the side wall of the bumper retainer, it is expected that the subject jounce bumper would begin to become increasingly stiff (i.e., to have less additional axial deflection at a given load) in comparison to a known jounce bumper that is formed from a similarly compliant material but which is unrestrained, as is represented in FIG. 6 by curve CJB. This increased stiffness characteristic of the jounce bumper assembly is represented along the load versus deflection curve in FIG. 6 by reference character LDB. Depending upon the specific arrangement, configuration and/or construction of the jounce bumper assembly, it will be understood that the influence of the retainer side wall in supporting the jounce bumper side wall may be reduced after a given amount of deflection has been reached. In such circumstances, the properties of the material forming the jounce bumper may become more prominent and could result in a somewhat reduced stiffness of the jounce bumper, as indicated by reference characters LDC of the load versus deflection curve in FIG. 6.

It will be recognized from the load versus deflection curve in FIG. 6 that a jounce bumper assembly in accordance with the present novel concept would be expected to provide an initially compliant performance characteristic that is similar to that of a known compliant jounce bumper. Upon further deflection, however, the subject jounce bumper assembly would be expected to provide substantially greater stiffness than such a known compliant jounce bumper yet remain more compliant than a known rigid jounce bumper. Additionally, it is expected that the subject jounce bumper assembly would be capable of withstanding loads comparable to those subjected to known rigid jounce bumpers, as indicated by the load versus deflection curve extending approximately as far along the LOAD axis as curve RJB, which is representative of a known rigid jounce bumper.

It should be understood that the deformations of the jounce bumper shown in FIG. 3 are provided merely as illustrations for presenting the foregoing discussion and, further, it should be recognized that such deformations are not to scale and are not intended to represent actual deformation conditions, which will vary from embodiment-to-embodiment depending, for example, upon the construction, configuration and properties of the materials used as well as upon other possible factors.

It will be appreciated that the jounce bumper and bumper retainer of a jounce bumper assembly in accordance with the present novel concept can be formed from any materials or combination of materials that may be suitable for the intended application, environment and/or conditions of use thereof. In one exemplary embodiment, jounce bumper 172 can be formed from one or more resilient materials, such as a rubber, a thermoplastic elastomer and/or an elastomeric foam, for example, alone or in combination with one another. Additionally, jounce bumper retainer 174 can be formed from one or more relatively rigid materials, such as a metal, a fiber (or otherwise) reinforced plastic and/or another high strength polymer (reinforced or unreinforced), for example, alone or in combination with one another.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly for use in forming an associated suspension system between an associated sprung mass and an associated unsprung mass of an associated vehicle, said gas spring assembly comprising:
   a first end member capable of being operatively connected to one of the associated sprung and unsprung masses;
   a second end member capable of being operatively connected to the other of the associated sprung and unsprung masses;
   a flexible wall including first and second open ends and disposed between said first and second end members to at least partially define a gas chamber therebetween, said first open end being secured on said first end member and said second open end being disposed along said second end member;
   an end closure including a closure bottom wall and a closure side wall extending from said closure bottom wall, said end closure positioned such that said closure bottom wall is disposed toward said second end member and said closure side wall is in abutting engagement with said second open end of said flexible wall, said end closure being secured along said second end member such that a substantially fluid-tight connection is formed along said second open end of said flexible wall;
   a bumper retainer including a retainer bottom wall and a retainer side wall extending from said retainer bottom wall, said retainer bottom wall including an opening extending therethrough, said bumper retainer supported on said second end member within said end closure such that said retainer bottom wall is disposed in abutting engagement with said closure bottom wall and said retainer side wall is disposed radially inwardly from said closure side wall; and,
   a resilient bumper including a bumper top wall, a bumper bottom wall, a bumper side wall extending therebetween and having a central axis extending between said bumper top and bottom walls, said resilient bumper on said second end member in fixed relation thereto and received within said bumper retainer such that at least a portion of said bumper bottom wall extends through said opening in said retainer bottom wall and abuttingly engages said closure bottom wall and such that at least a portion of said bumper side wall is disposed radially inwardly of said retainer side wall forming a free volume therebetween, said free volume capable of permitting said retainer side wall to engage said bumper side wall under axial deflection of said jounce bumper to thereby restrict radially outward deflection of said jounce bumper.

2. A gas spring assembly according to claim 1, wherein said resilient bumper has a bumper height and said bumper retainer has a retainer height of from about 20 percent to about 80 percent of said bumper height.

3. A gas spring assembly according to claim 1, wherein said retainer side wall and said bumper side wall are disposed at a non-zero angle relative to one another to thereby at least partially define said free volume with at least one of said retainer side wall and said bumper side wall at least partially forming a frustoconical surface.

4. A gas spring assembly according to claim 3, wherein said bumper retainer has a central axis and said retainer side wall is disposed at an angle of from about 5 degrees to about 50 degrees relative to said central axis.

5. A gas spring assembly according to claim 3, wherein said jounce bumper has a central axis and said bumper side wall is disposed at an angle of from about 1 degree to about 15 degrees relative to said central axis.

6. A gas spring assembly according to claim 1, wherein at least a portion of said retainer bottom wall is positioned between said closure bottom wall and said bumper bottom wall.

7. A gas spring assembly according to claim 6, wherein said bumper bottom wall biases said retainer bottom wall into abutting engagement with said closure bottom wall.

8. A gas spring assembly comprising:
   a first end member and a second end member spaced from said first end member;
   a flexible wall disposed between said first and second end members and forming a substantially fluid-tight connection with each thereof to form a spring chamber therebetween;
   a jounce bumper supported within said spring chamber on one of said first and second end members, said jounce bumper including an axis, a first bumper end wall, a second bumper end wall spaced from said first bumper end wall, and a bumper side wall extending between said first and second bumper end walls; and,
   a bumper retainer supported within said spring chamber on said one of said first and second end members, said bumper retainer including an axis, a retainer bottom wall with an opening formed therethrough at least partially defining a first open end of said bumper retainer, and a retainer side wall having a length and extending from said retainer bottom wall toward an opposing second open end of said bumper retainer, said bumper retainer supported on said one of said first and second end members such that at least a portion of said retainer bottom wall abuttingly engages a corresponding end surface of said one of said first and second end members and such that said retainer side wall is spaced radially inwardly from a corresponding side surface of said one of said first and second end members along a major portion of said length of said retainer side wall;

said jounce bumper and said bumper retainer being secured to said one of said first and second end members such that at least a portion of said first bumper end wall abuttingly engages said corresponding end surface through said opening and at least a portion of said retainer bottom wall is compressively captured between said first bumper end wall and said corresponding end surface of said one of said first and second end members, and positioned within said spring chamber in approximately coaxial relation to one another such that:

said bumper side wall and said retainer side wall extend at a non-zero angle relative to one another and upon one of said first and second bumper end walls engaging said retainer bottom wall a first radial gap is formed between said bumper side wall and said retainer side wall at a first axial position and a second radial gap between said bumper side wall and said retainer side wall is formed at a second axial position that is spaced from said first axial position; and, upon axial displacement of said first and second bumper end walls toward one another due to relative movement of said first and second end members toward one another compressively engaging said jounce bumper therebetween, said bumper side wall and said retainer side wall abuttingly engaging one another thereby at least partially resisting radially outward displacement of said jounce bumper, said radially outward displacement being induced by said axial displacement of said jounce bumper.

9. A gas spring assembly according to claim 8, wherein said bumper retainer is supported on said first end member with said open end disposed toward said second end member and said jounce bumper supported on said first end member within said bumper retainer.

10. A gas spring assembly according to claim 9, wherein said second axial position is spaced from said first axial position in a direction extending away from said first end member such that said second radial gap is greater than said first radial gap.

11. A gas spring assembly according to claim 8, wherein said jounce bumper has a bumper height and said bumper retainer has a retainer height of from about 20 percent to about 80 percent of said bumper height.

12. A gas spring assembly according to claim 8, wherein said bumper side wall and said retainer side wall are disposed at an angle relative to one another of from about 5 degrees to about 50 degrees.

13. A gas spring assembly according to claim 8, wherein said one of said first and second end members is a piston and includes an end closure secured to said piston with said end closure including at least said corresponding end surface and said corresponding side surface.

* * * * *